Patented Dec. 24, 1946

2,413,159

UNITED STATES PATENT OFFICE 2,413,159

CERAMIC BODY

Woldemar A. Weyl, State College, Pa., assignor to Monsanto Chemical Company, a corporation of Delaware No Drawing. Application April 2, 1943, Serial No. 481,589

20 Claims. (Cl. 106—55)

This invention provides new refractory ceramic compositions comprising as a major constituent apatite, natural or synthetic, or monazite. It further provides a combination with such refractory bodies of a glassy matrix, the combination having improved electrical and mechanical properties.

Ceramic bodies of the porcelain type are usually made of three essential constituents, namely:

(1) Kaolin and clay.
(2) Flint ($SiO_2$).
(3) Felspar (potassium and aluminum silicates).

The clay and flint together form the refractory part of the ceramic body, while the felspar, having a lower fusion point, serves as a matrix which bonds the particles together and fills the voids in the mass, thereby producing a dense body of low porosity. The flux is usually felspar, which mineral always contains alkali. It has long been known that alkali metal compounds should be absent or present only in minor amounts in ceramic bodies used for electrical purposes because of the tendency of these elements to ionize when subjected to electrical stresses, thus contributing to electric conductivity and lowering the electric breakdown strength.

In my pending application, Serial No. 376,181, filed January 27, 1941, I have disclosed and claimed ceramic masses in which the glassy matrix was composed of a multicomponent phosphate glass. In the compositions disclosed the body of the material was composed of flint and kaolin. I have now found that stronger bodies may be obtained which are more resistant to thermal shock by employing as the crystalline constituent of the ceramic body either apatite or monazite, both of which are crystalline refractory phosphates of common occurrence. Apatite is generally considered to be calcium fluo orthophosphate, $Ca_5F(PO_4)_3$, while monazite is a mixture of the orthophosphates of cerium, lanthanum and didymium $(Ce, La, Di)PO_4$. Some thorium oxide, $ThO_2$, is usually associated with the rare earth phosphates in the monazite mineral, which usually occurs as a sand. My improved compositions accordingly provide ceramic bodies having increased strength due to the greater tendency of the glassy phosphate phase to wet (and adhere to) the refractory crystalline phase. I use the term "wet" in a figurative sense. What apparently takes place is that the multicomponent phosphate glassy phase when in the molten condition spreads over the more refractory apatite or monazite crystal surfaces, completely penetrating the interstices between the crystal and partly dissolving the crystals thus providing in the finished ware a substantially continuous glassy bond for the crystal particles.

While generally the trivalent metal phosphate glasses disclosed in my above mentioned application are applicable I prefer to proportion the glassy matrix so that it will contain from 5% to 40% of a divalent metal metaphosphate, the balance being substantially all trivalent metal metaphosphate. Of the several trivalent metal metaphosphates available I prefer to employ aluminum metaphosphate.

As the divalent metal metaphosphate component of the glassy phase I may use any one or a mixture of the following: calcium metaphosphate, magnesium metaphosphate, barium metaphosphate, zinc metaphosphate. For those applications where the electrical conductivity of the body is not the primary consideration I may employ in addition minor proportions of alkali metal metaphosphates such as sodium metaphosphate, potassium metaphosphate, etc. However, for insulating bodies subjected to high dielectric stresses, it is desirable that the content of alkali metal metaphosphate be as low as practical. In cases where multicomponent phosphate glasses can be used containing small amounts of alkali, it is particularly easy to impart plasticity by allowing the glass to age somewhat in contact with water. However, even when the glass is substantially free of alkali bearing compounds, hydrolysis may be usually effected by extending the period of treatment with water, or by treating with warm water. This is effected by finely grinding the multi-component phosphate glass and subjecting all or part of the finely ground glass to the hydrolyzing action of water at room or slightly elevated temperature for a period of time sufficient to at least partly hydrolyze the surface of the particles. In order to impart the desired plasticity or colloidal properties the mixture should contain say from 5% to 30% of the multi-component phosphate glass, the balance being either apatite or monazite. The apatite or monazite containing the phosphate glass may then be ground in a ball mill with water and the resultant mass filtered. The slabs of paste so produced are removed from the filter press and stored while damp until ready for use. The shaping can be accomplished by one of several methods known in the art of making ceramic insulators, preferably pressing in a rather dry state with or without the addition of bonding agents such as gum arabic or oil.

The presence of the partly hydrolyzed multicomponent phosphate glass imparts plasticity to the resultant mass, increases the dry strength and then upon firing produces an appreciably stronger ceramic body.

What I claim is:

1. A ceramic body comprising refractory phosphate particles bonded together in said body by means of a glassy matrix essentially comprising a multicomponent trivalent metal metaphosphate glass.

2. A ceramic body comprising a major proportion of refractory phosphate particles bonded together in said body by means of a minor amount of a glassy matrix essentially comprising a trivalent and a divalent metal metaphosphate.

3. A ceramic body comprising from 70% to 95% by weight of refractory phosphate particles bonded together by means of from 30% to 5% by weight of a multicomponent phosphate glass essentially comprising a trivalent and a divalent metal metaphosphate.

4. A ceramic body comprising from 70% to 95% by weight of apatite particles bonded together by means of from 30% to 5% by weight of a multicomponent phosphate glass essentially comprising a trivalent and a divalent metal metaphosate.

5. A ceramic body comprising from 70% to 95% by weight of monazite particles bonded together by means of from 30% to 5% by weight of a multicomponent phosphate glass essentially comprising a trivalent and a divalent metal metaphosphate.

6. A plastic mass suitable for producing ceramic bodies comprising in combination refractory phosphate particles and a multicomponent trivalent metal metaphosphate glass.

7. A plastic mass suitable for producing ceramic bodies comprising on a dry basis from 70% to 95% by weight of a refractory phosphate together with from 30% to 5% by weight of a multicomponent trivalent metal metaphosphate glass.

8. A plastic mass suitable for producing ceramic bodies comprising on a dry basis from 70% to 95% by weight of apatite together with from 30% to 5% by weight of a multicomponent trivalent metal metaphosphate glass.

9. A plastic mass suitable for producing ceramic bodies comprising on a dry basis from 70% to 95% by weight of monazite together with from 30% to 5% by weight of a multicomponent trivalent metal metaphosphate glass.

10. A plastic mass suitable for shaping into ceramic bodies comprising on a dry basis from 70% to 95% by weight of a refractory phosphate together with from 30% to 5% by weight of a partly hydrolyzed multicomponent trivalent metal metaphosphate glass.

11. A fired ceramic body comprising refractory phosphate particles bonded together in said body by means of a matrix essentially comprising a multicomponent trivalent metal metaphosphate glass.

12. A fired ceramic body comprising a major proportion of refractory phosphate particles bonded together in said body by means of a minor proportion of a glassy matrix composed essentially of a trivalent and a divalent metal metaphosphate.

13. A fired ceramic body comprising from 70% to 95% by weight of apatite particles bonded together in said body by means of from 30% to 5% by weight of a multicomponent phosphate glass composed essentially of a trivalent and a divalent metal metaphosphate.

14. The ceramic body defined in claim 13 in which the bond is composed of from 95% to 60% by weight of aluminum metaphosphate and from 5% to 40% by weight of calcium metaphosphate.

15. The ceramic body defined in claim 13 of which the bond is composed of from 95% to 60% by weight of aluminum metaphosphate and from 5% to 40% by weight of zinc metaphosphate.

16. The ceramic body defined in claim 13 in which the bond is composed of from 95% to 60% by weight of aluminum metaphosphate and from 5% to 40% by weight of barium metaphosphate.

17. A fired ceramic body comprising from 70% to 95% by weight of monazite particles bonded together in said body by means of from 30% to 5% by weight of a multicomponent phosphate glass composed essentially of a trivalent and a divalent metal metaphosphate.

18. The ceramic body defined in claim 17 in which the bond is composed of from 95% to 60% by weight of aluminum metaphosphate and from 5% to 40% by weight of calcium metaphosphate.

19. The ceramic body defined in claim 17 in which the bond is composed of from 95% to 60% by weight of aluminum metaphosphate and from 5% to 40% by weight of zinc metaphosphate.

20. The ceramic body defined in claim 17 in which the bond is composed of from 95% to 60% by weight of aluminum metaphosphate and from 5% to 40% by weight of barium metaphosphate.

WOLDEMAR A. WEYL.